United States Patent [19]
Hise et al.

[11] Patent Number: 5,630,328
[45] Date of Patent: May 20, 1997

[54] NATURAL GAS CONDITIONING FACILITY

[75] Inventors: Ralph E. Hise; Paul F. Swenson, both of Shaker Heights, Ohio

[73] Assignee: Consolidated Natural Gas Service Company, Inc., Pittsburgh, Pa.

[21] Appl. No.: 532,422

[22] Filed: Sep. 22, 1995

[51] Int. Cl.[6] .................................................. F25J 1/00
[52] U.S. Cl. ................................................ 62/619; 62/7
[58] Field of Search ................................ 62/7, 613, 619

[56] References Cited

U.S. PATENT DOCUMENTS

| | | | |
|---|---|---|---|
| 2,903,858 | 9/1959 | Bocquet | 62/613 |
| 3,360,945 | 1/1968 | Thornton et al. | 62/613 |
| 3,754,405 | 8/1973 | Rosen | 62/619 |
| 4,456,459 | 6/1984 | Brundige, Jr. | 62/613 |
| 4,563,201 | 1/1986 | Brundige, Jr. | 62/613 |
| 5,327,730 | 7/1994 | Myers et al. | 67/7 |

*Primary Examiner*—Ronald C. Capossela
*Attorney, Agent, or Firm*—Pearne. Gordon, McCoy & Granger

[57] ABSTRACT

A facility for conditioning compressed natural gas to be dispensed to vehicle fuel tanks is provided that includes a fuel storage system, a chilling apparatus, and a fuel dispensing system. The chilling apparatus includes a refrigeration system and a liquid separator. The refrigeration system cools the compressed natural gas to near freezing temperature and/or a sub freezing temperature to remove water vapor, to remove higher hydrocarbons, and/or to obtain a full fill of the vehicle fuel tanks. The liquid separator is located downstream of the refrigeration system to remove any condensed liquids from the natural gas. A desiccant bed can be provided downstream of the liquid separator to remove any residual liquids remaining in the natural gas.

25 Claims, 6 Drawing Sheets

NATURAL GAS CONDITIONING FACILITY

BACKGROUND OF THE INVENTION

The invention relates to a method and apparatus for conditioning compressed natural gas for use in a natural gas powered vehicle.

DESCRIPTION OF RELATED ART

Compressed natural gas powered vehicles typically store natural gas in a fuel tank or cylinder in a high-density or compressed gaseous state at peak pressures of for example 3000 to 3600 psig. The natural gas is compressed to increase its energy density thereby decreasing its storage volume and increasing the range of the vehicle. The vehicle fuel tank is typically a metal tank or a tank having a metal liner with resin-impregnated filament winding. With a metal tank it is important to avoid corrosion and corrosion related damage, for example stress corrosion cracking and corrosion fatigue. Corrosion can be induced by corrosive agents in natural gas such as water vapor.

Additionally, water vapor in the natural gas may also cause faulty operation of as well as damage to the vehicle engine. The water vapor in the natural gas can condense and freeze as it expands going through a regulator of the vehicle fuel tank to form ice. The ice blocks the flow of the natural gas and impedes operation of the engine. The temperature of ice formation may be higher than expected as natural gas molecules can be incorporated in the ice crystals (hydrates). Hydrates also may build up in wet high pressure gas lines and storage tanks.

Because of these problems natural gas may require dewatering prior to being dispensed into the vehicle fuel tank in order to provide satisfactory operation for users. Accordingly, the Society of Automotive Engineers (SAE) states in Recommended Practice SAE J1616 (composition limits for compressed natural gas for vehicles) that the water dew point temperature of the fuel be set so that condensation of water will not occur in the vehicle fuel tank at peak pressure and the lowest temperature at which the vehicle will operate. Therefore, the SAE recommends that the dew point temperature at peak fuel tank pressure be set to at least 10 degrees Fahrenheit (F) below the local monthly lowest dry-bulb temperature referenced in tables established by the American Society of Heating, Refrigeration and Air Conditioning Engineers (ASHRAE) for the specific geographic location or operating area. Typically, a fueling station or facility controls water vapor content by placing a suction side dryer such as a desiccant bed between a natural gas supply line and a compressor used to compress the natural gas for site storage at pressures up to 3600 to 5000 psig. These suction side dryers can be expensive to purchase and operate. Therefore, there exists a need for an inexpensive way to set the water dew point temperature at or below the recommended limit.

It is also a recognized problem that if the vehicle fuel tank is simply fast charged to its rated pressure from a source at or near ambient temperature it will be under-filled in mass. It has long been known that a gas will increase in temperature when introduced into a tank from a source of higher pressure. When the filling time is short compared to the time required for the tank and gas to stabilize in temperature through heat transfer to surroundings at ambient temperature, the increase in temperature results in a corresponding increase in pressure. Thus, the tank will not contain a full mass charge when the gas in the tank subsequently cools to ambient temperature. A fueling station or facility can compensate by over-pressurizing the fuel tank during refueling by some amount so that when the fuel cools to ambient temperature, and the pressure drops correspondingly, the fuel tank approaches a full mass charge. It can be difficult, however, to determine how much over-pressurization is required, resulting in either over filling or under filling. Repeated over-pressurization may result in non-compliance with the ANSI NGV2 Standard for NGV fuel tanks, which limits the number of over-pressure cycles the vehicle tanks can be subjected to. Therefore, there exists a need for a convenient and reliable way to compensate for the heating of the gas that occurs during fast filling that avoids over-pressuring, or at least minimizes over-pressuring to an amount acceptable under ANSI NGV2.

Another recognized problem is oil carry over vapor. Compressor lube oil vapor is carried by the natural gas and builds up behind a diaphragm of the vehicle pressure regulator causing failure of the regulator. Therefore, there exists a need for a convenient and reliable way to remove the lube oil carry over vapor from the natural gas compressor.

SUMMARY OF THE INVENTION

The present invention provides a facility and method for conditioning compressed natural gas to be dispensed to vehicle fuel tanks that can economically dewater the compressed natural gas, compensate for the heating of the gas that occurs during fast filling, and remove lube oil carry over vapor. The facility includes a fuel storage system for compressed natural gas, a dispensing system for dispensing the natural gas to the vehicle fuel tanks, and a chilling apparatus. The chilling apparatus includes a refrigeration unit for cooling the natural gas to a sub ambient temperature and a liquid separator for removing condensed liquids from the natural gas downstream of the refrigeration unit. In one embodiment, a desiccant bed is provided down stream of the liquid separator to remove any residual liquids in the compressed natural gas.

BRIEF DESCRIPTION OF THE DRAWINGS

These and other features and advantages of the present invention will be apparent with reference to the following description taken in conjunction with the accompanying drawings, wherein.

DETAILED DESCRIPTION OF PREFERRED EMBODIMENTS

Figure 1:
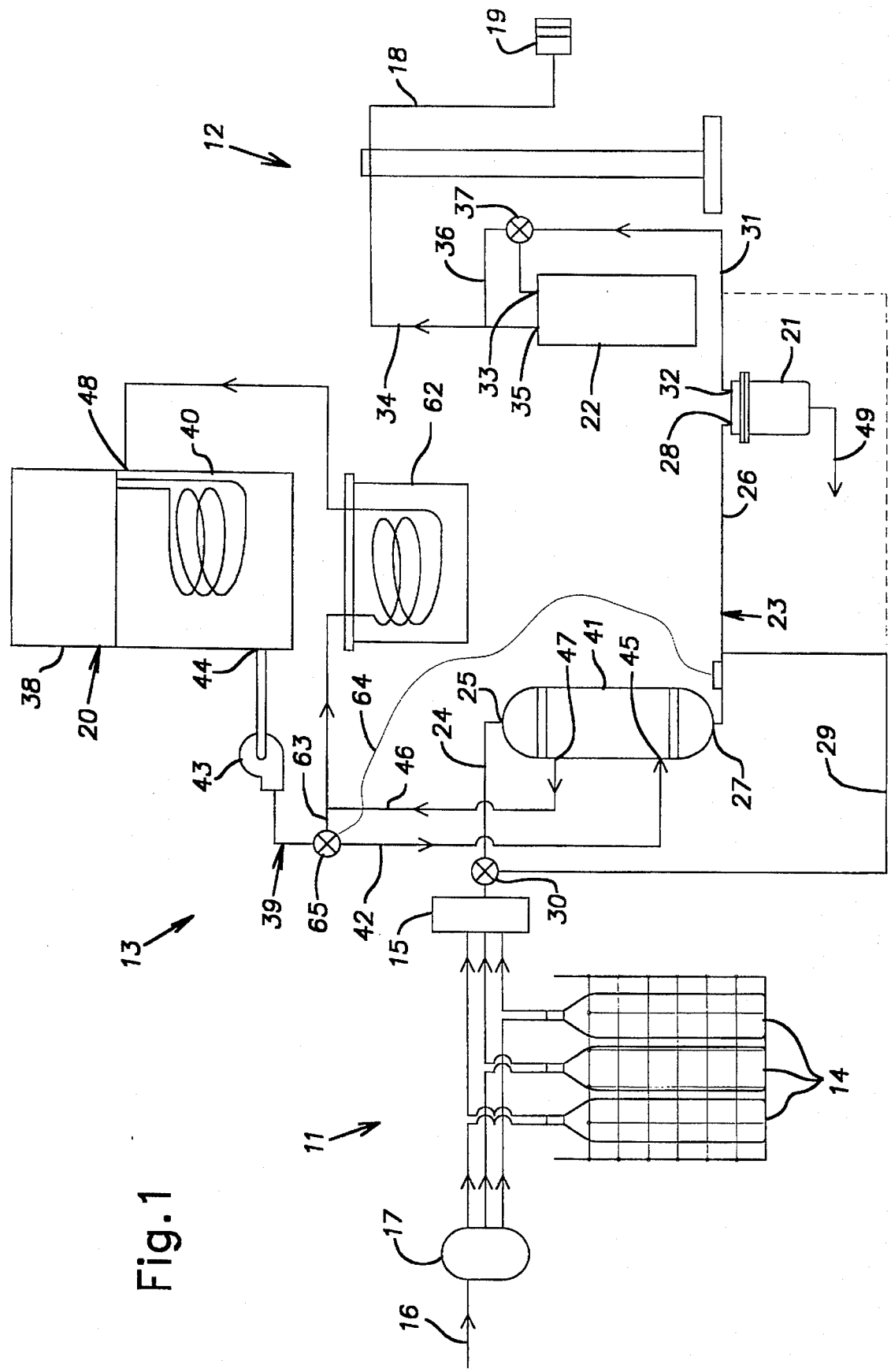
FIG. 1 is a diagrammatic illustration of a natural gas conditioning facility in accordance with one embodiment of the invention.

Referring to FIG. 1, there is diagrammatically shown a natural gas conditioning facility for refueling vehicles with compressed natural gas (CNG). The facility includes a fuel storage system 11, a fuel dispensing system 12, and a chilling apparatus 13. The fuel storage system 11 typically includes a set or bank of supply or storage tanks 14 contained in a metal cage for storing CNG at pressures up to 3600–5000 psig as is known in the art. Preferably, the bank of storage tanks 14 are connected in cascade fashion by an automatically controlled distribution valve 15 as is known in the art. The storage tanks 14 typically are operated at different pressure levels, for example differing by 1000 psi or more. Typically, a natural gas supply line 16 delivers natural gas at a low pressure ordinarily not more than several atmospheres. Because the natural gas supply line 16 delivers natural gas at such a low pressure, a multistage compressor 17 having cooling between stages is provided upstream of the storage tanks 14. Therefore, the required high pressure level in each of the storage tanks 14 is maintained by the compressor 17.

The dispensing system 12 includes a fuel input line or hose 18 and a fueling connector 19. A first end of the fuel input line 18 is connected with the fueling connector 19. A second end of the fuel input line 18 is coupled to the storage tanks 14 containing the CNG. The fuel connector 19 is adapted to connect the fuel input line 18 with a port of vehicle fuel tanks (not shown). Vehicle fuel tanks are typically rated to store CNG at pressures up to 3000 to 3600 psig.

The chilling apparatus 13 is located between the fuel storage system 11 and the dispensing system 12 and includes a refrigeration system 20 and a liquid separator 21. A fuel line or delivery circuit 23 generally couples the fuel storage system 11 and the fuel input line 18 of the dispensing system 12. The fuel delivery circuit 23 has a first portion 24 that couples the distribution valve 15 of the storage system 11 to the refrigeration system 20 at inlet 25.

The refrigeration system 20 is in thermal communication with the CNG flowing in the fuel delivery circuit 23 to cool the CNG to a predetermined sub ambient temperature as it is dispensed to the vehicle fuel tank. The refrigeration system 20 includes a chiller 38 having a cooling loop with a refrigerant fluid as is known in the art. It will be understood by those skilled in the art that the refrigerant fluid can be in heat exchange with the CNG without an intermediate heat exchange fluid, if desired. The CNG is cooled to condense and remove water vapor present in the CNG to a temperature at least 10 degrees F. below the normal average monthly lowest dry-bulb temperature for the operating area in compliance with SAE J1616. In areas of the midwest such as Ohio and Illinois this chilling temperature could be −10 degrees F. for example. In other areas, such as Minnesota, it is desirable for the chilling temperature to be −20 degrees F. for example to ensure adequate dewatering. The CNG is also cooled to condense and remove hydrocarbons (C4's and up) and/or compressor lube oil carry over vapor. Furthermore, the CNG is cooled before dispensing to obtain a full mass charge of the vehicle fuel tank. It has been derived and demonstrated that a full fill can be guaranteed by precooling the CNG about 30 to 50 degrees F. below 70 degrees F. (that is about 20 to 40 degrees F.) and thereby achieving full filling to the rated 70 degree fill pressure.

The present invention, therefore, cools the CNG to solve the moisture problem, the underfill problem, and the lube oil carry over problem. It is noted that in facilities having suction side dryers, that is, dryers upstream of the multistage compressor 17, or otherwise having dry (relatively water free) gas supplies, the present invention cools the CNG to solve the underfill problem and the lube carry over problem.

In facilities where water vapor must be removed from the CNG, the CNG is preferably cooled to a near freezing temperature such as in the range of about 33 to about 38 degrees F., and more preferably to about 35 degrees F. Natural gas at 3600 psia and 35 degrees F. has a water content or saturation point of approximately 4 pounds per million standard cubic feet (LB/MSCF). Therefore, as the CNG is cooled to 35 degrees F. any water vapor present in the CNG in excess of 4 LB/MSCF will be condensed out of the CNG. Residual water vapor can be removed by subsequent desiccant polishing and/or freezing, as described hereinafter. Cooling the CNG to approximately 35 degrees F. also substantially removes or drops out heavy or higher hydrocarbons (c4's and up) and/or compressor lube oil carry over vapor.

It is essential to recognize that water condensed in high pressure natural gas tends to freeze at higher than expected temperatures, that is, to form hydrate crystals. A periodic defrost cycle, as is known in the art, may be added to remove any ice or hydrate build-up in the heat exchanger 41 and the liquid separator 21.

The chiller 38 can be sized to deliver the full cooling load or instant demand for cooling the natural gas as it intermittently and variably flows to the vehicle fuel tanks from the fuel storage system 11. However, it is preferable to have a buffer so that the cooling load can be spread over a longer period of time than required for actually filling vehicle tanks. Thus the chiller 38 can be sized for a cooling load or rate that includes the time required to move vehicles in and out of the refueling area and couple them to the fuel delivery line 18. Preferably, a buffer is provided by including a secondary cooling loop 39 having a storage tank 40 and a heat exchanger 41. The heat exchanger 41 is preferably a shell and tube type heat exchanger adapted for the pressures of the CNG as is known in the art. The secondary cooling loop 39 has a feed portion 42 with a pump 43 and couples an outlet 44 of the storage tank 40 to the shell inlet 45 of the heat exchanger 41. A return portion 46 of the secondary cooling loop 39 couples a shell outlet 47 of the heat exchanger 41 to an inlet 48 of the storage tank 40.

An intermediary or secondary heat exchange fluid flows in the secondary cooling loop 39 and is in thermal communication with the refrigerant fluid of the chiller 38. The secondary heat exchange fluid is cooled by the refrigerant fluid of the chiller 38 and is stored in the storage tank 40 at the cold, that is sub ambient, temperature. The buffer, therefore, provides cold storage capacity in the storage tank 40. The secondary heat exchange fluid is preferably a mixture of generally 50% water and 50% ethylene glycol. The secondary heat exchange fluid is pumped by the pump 43 from the storage tank 40 through the feed portion 42 to the inlet 45 of the heat exchanger 41, through the shell of the heat exchanger 40 in thermal communication with the flowing natural gas, out the outlet 47 of the heat exchanger, and back to the storage tank 40 through the return portion 46. It is calculated a chiller rated at approximately 27,000 BTU/hr will cool 3600 psi natural gas flowing continuously at 200 standard cubic feet per minute (SCFM) from 95 degrees F. to 35 degrees F. With the addition of a 60 gallon storage tank as shown in FIG. 1, intermittent flows of up to 500 SCFM, as does occur at light duty natural gas vehicle quick-fill facilities, can be cooled to a like extent so long as the time-average flow does not exceed 200 SCFM.

The secondary cooling loop allows the use of an ice storage tank 62, such as a Calmac ice storage tank, to take advantage of low utilization of the fueling station. The ice storage tank 62 is sized to handle the bulk of peak thermal demands due to intermittent and variable fueling during working hours while the chiller 38 is sized to operate about 24 hours a day. Therefore, a chiller of proportionally lower capacity can be utilized. With typical working hours being eight hours a day, a chiller horsepower can be reduced by two-thirds. The chiller As shown in FIG. 1, the ice storage tank 62 can be located in the return portion 46 of the secondary cooling loop 39 to operate as a pre-cooler. The secondary heat exchange fluid returning from the heat exchanger 41 flows through the ice storage tank, which is at about 32 degrees F., to be pre-cooled to a near freezing temperature such as a temperature in the range of about 38 to 35 degrees F. The pre-cooled secondary heat exchange fluid then flows through the storage tank 40 to be chilled to the desired temperature of, for example, 20 degrees F. and back to the heat exchanger 41 to cool the CNG.

Preferably, a bypass line 63 having a control system 64 with a valve 65 is provided to bypass the heat exchanger 41 when the fuel is not being dispensed. The bulk of the flow bypasses the heat exchanger 41 to refreeze the water in the ice storage tank 62 during periods when vehicles are not being fueled, which may be periods of up to about 16 hours a day.

The secondary cooling loop 39 also allows the chiller 38 to be located remote from the storage system 11 and the dispensing system 12 as shown in FIG. 1. The remote location of the chiller 38 is preferably at least a distance adequate to eliminate the need for the chiller 38 to have an explosion proof rating such as, for example, 25 feet. Eliminating the necessity for an explosion proof rating significantly reduces the cost of the chiller 38.

The liquid separator 21 is known in the art and located in the fuel delivery circuit 23 downstream of the refrigeration system 20. A second portion 26 of the fuel delivery circuit 23 couples an outlet 27 of the refrigeration system heat exchanger 41 to an inlet 28 of the liquid separator 21. Preferably, a bypass line 29 having a valve 30 is provided to connect the first and second portions 24, 26 of the fuel delivery circuit 23 so that the CNG can bypass the refrigeration system 20 when desired such as for periodic maintenance of the refrigeration system.

A desiccant bed 22 of a design known in the art and can be located in the fuel delivery circuit 23 downstream of the liquid separator 21 to remove any residual liquids. As illustrated in FIG. 1, a third portion 31 of the fuel delivery circuit 23 couples an outlet 32 of the liquid separator 21 to an inlet 33 of the desiccant bed 22. A fourth portion 34 of the fuel delivery circuit 23 couples an outlet 35 of the desiccant bed 22 to the fuel input line 18. Preferably, a second bypass line 36 having a valve 37 is provided to connect the third and fourth portions 31, 34 of the fuel delivery circuit 23 so that the CNG can bypass the desiccant bed 22 when desired such as for periodic maintenance which would include replacement or regeneration of the desiccant material.

Preferably, the desiccant bed 22 contains a quantity of desiccant sufficient for operation of the chilling apparatus 13 for at least one season, that is, approximately four months for compliance with SAE J-1616 in a temperature climate such as exists in Cleveland, Toronto, Chicago, or New York City. It is calculated that a single 8 pound replaceable bed of desiccant will remove the residual liquids for a throughput of approximately 1 million standard cubic feet of CNG, 10,000 gallons of gasoline equivalent, and thus would need to be replaced approximately once a year.

When a vehicle is to be refueled, the CNG flows from the distribution valve 15 of the fuel storage system 11 through the first portion 24 of the fuel delivery circuit 23 to the tube inlet 25 of the heat exchanger 41. The CNG flows through tubes of the heat exchanger 41 in thermal communication with the secondary heat exchange fluid and is generally cooled to approximately 35 degrees F. to substantially condense any water vapor and/or higher hydrocarbons in the CNG and to solve the full fill problem.

It will be noted that the CNG may not require cooling for full-fill purposes when the ambient temperature is below approximately 35 degrees F., or preferably 32 degrees F. Therefore, the refrigeration system 20 may be bypassed by means of the bypass line 29 when a polishing desiccant 22 is employed. Alternatively, when there is a suction side dryer, the entire chilling apparatus 13 can be bypassed by means of the bypass line 29 (shown in dashed line).

As the CNG flows from the outlet 27 of the heat exchanger 41 it passes through the second portion 26 of the fuel delivery circuit 23, substantially carrying along the condensed liquids, to the inlet 28 of the liquid separator 21. The liquid separator 21 removes or separates the condensed liquids from the CNG. The condensed liquids are drained off in a drain or drop off line 49.

The CNG flows from the outlet 32 of the liquid separator 21 through the third portion 31 of the fuel delivery circuit 23 to the inlet 33 of the desiccant bed 22. The CNG passes through the desiccant bed 22 and any residual liquids remaining in the CNG are substantially removed. It will be noted that the desiccant bed 22 may not be required when the monthly lowest dry-bulb temperature for the geographic area is above 45 degrees F. Thus, the desiccant bed 22 can be bypassed by means of the bypass line 36. Bypassing the desiccant bed 22 in this manner will further extend the life of the replaceable charge of the desiccant bed 22.

As the CNG flows from the outlet 35 of the desiccant bed 22 it passes through the fourth portion 34 of the fuel line 23, to the fuel input line 18 of the dispensing system 12. The CNG is thereafter dispensed into the vehicle fuel tanks through the fuel connector 19.

Figure 2:
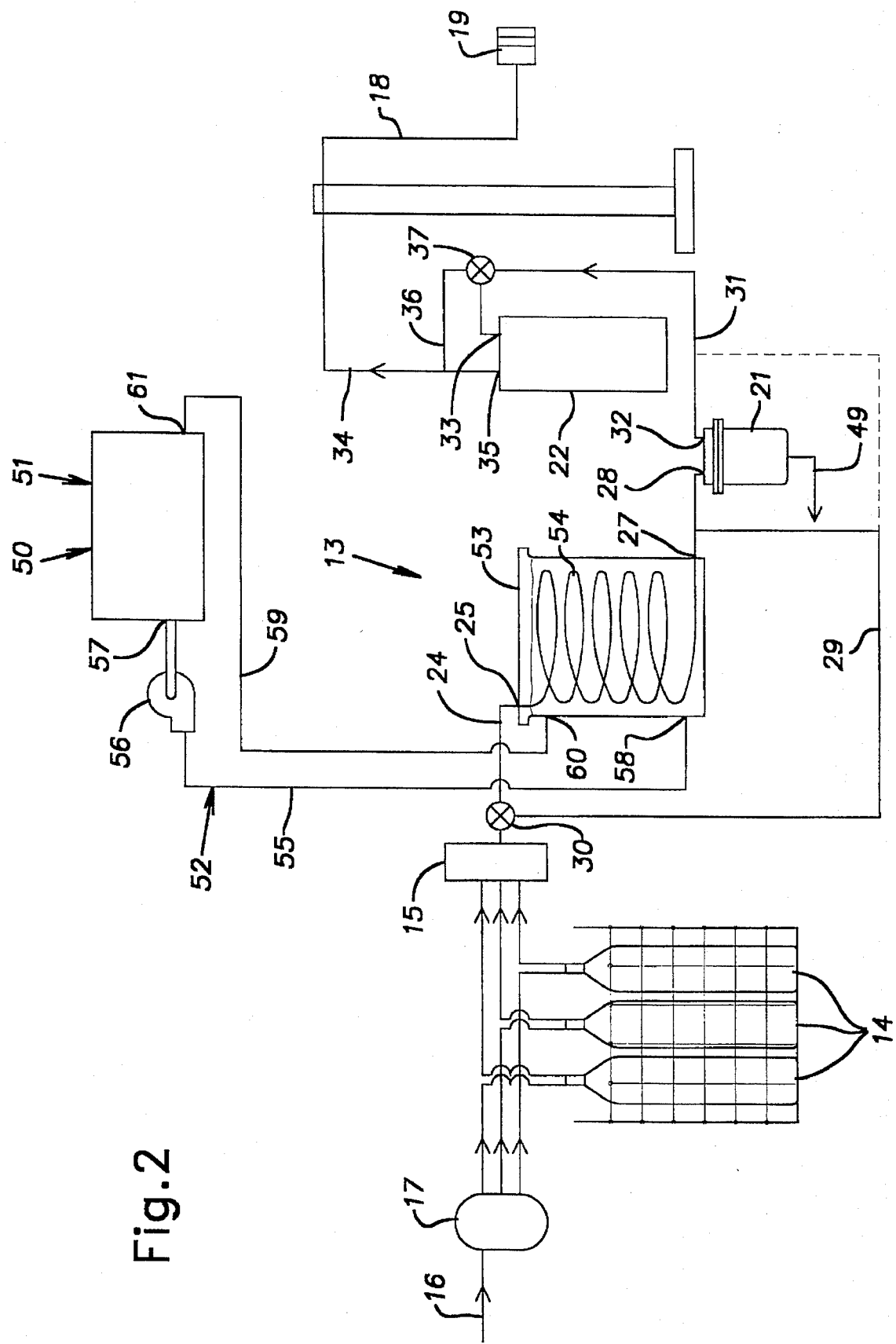
FIG. 2 is a diagrammatic illustration of a variation of the natural gas conditioning facility of FIG. 1.

A variation of the natural gas conditioning facility of FIG. 1 is diagrammatically shown in FIG. 2. The natural gas conditioning facility of FIG. 2, with the exception of the secondary cooling loop, has essentially the same construction as described above for the natural gas conditioning facility of FIG. 1. A refrigeration system 50 includes a chiller 51 and an intermediary or secondary cooling loop 52 with a storage tank 53 and a heat exchanger 54. The chiller 51 is located remote from the site and the storage tank 53 is located at the site. The storage tank 53 stores the intermediary or secondary heat exchange fluid at a cold, that is sub ambient, temperature and is preferably a plastic tub adapted for cold storage. The heat exchanger 54 is preferably of a thin tube type as is known in the art and is immersed in the storage tank 53. The secondary cooling loop 52 has a feed portion 55 with a pump 56 and couples an outlet 57 of the chiller 51 to an inlet 58 of the storage tank 53. A return portion 59 of the secondary cooling loop 52 couples an outlet 60 of the storage tank 53 to an inlet 61 of the chiller 51.

The intermediary or secondary heat exchange fluid flows in the secondary cooling loop 52 and is in thermal communication with the refrigerant fluid of the chiller 51. The secondary heat exchange fluid is cooled by the chiller 51 and is pumped by the pump 56 through the feed portion 55 to the storage tank 53. The secondary heat exchange fluid is stored at the cold temperature in the storage tank 53 where it is in thermal communication with the heat exchanger 54 to cool the flowing natural gas. The buffer, therefore, provides cold storage capacity in the storage tank 53. The secondary heat exchange fluid is pumped back to the chiller 51 through the return portion 59 where it is again cooled by the chiller 51. The flow path of the natural gas is as described above for the natural gas conditioning facility of FIG. 1.

Figure 3:
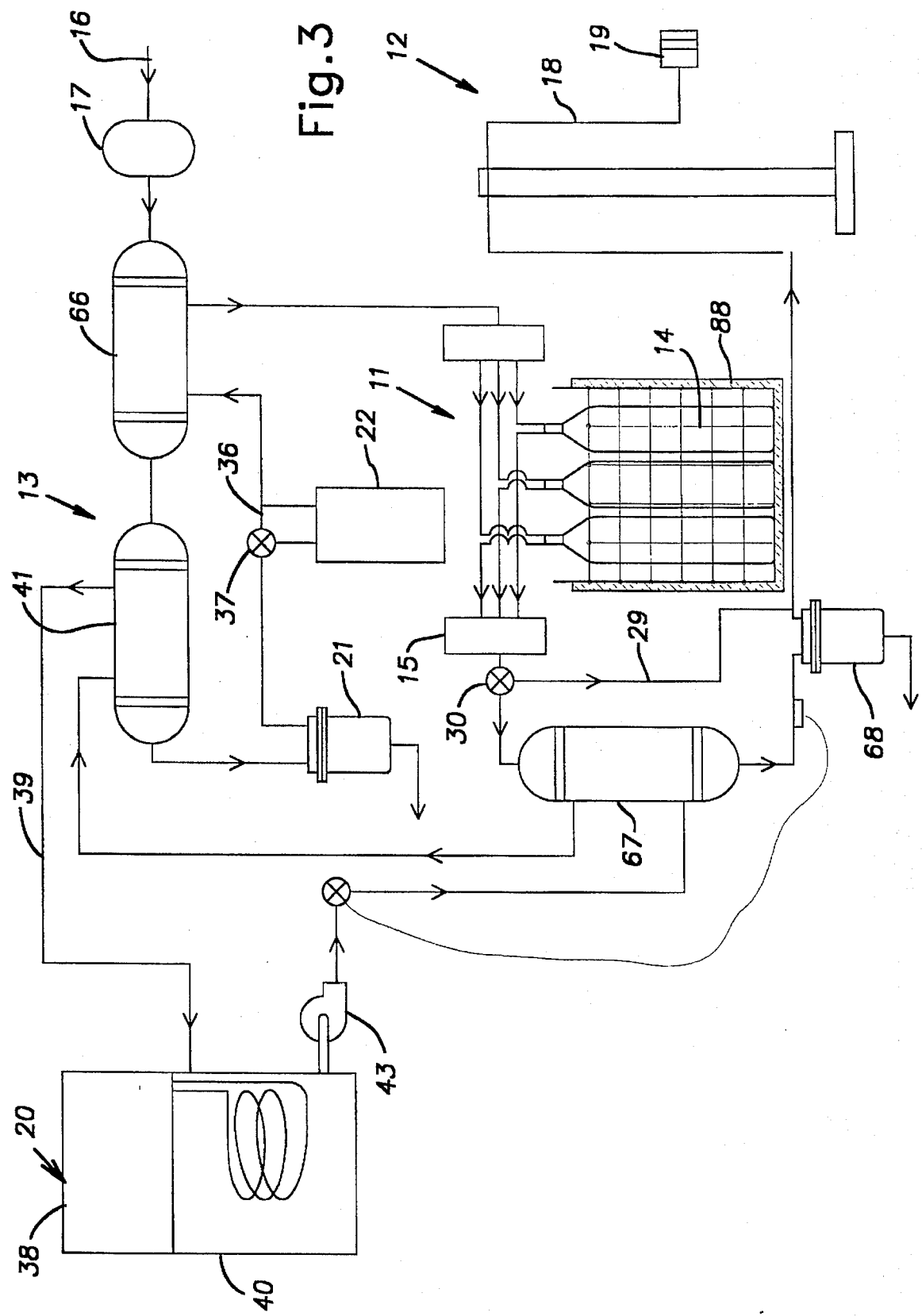
FIG. 3 is a diagrammatic illustration of a natural gas conditioning facility in accordance with a second embodiment of the invention.

A second embodiment of a natural gas conditioning facility according to the invention is diagrammatically shown in FIG. 3. The natural gas conditioning facility of FIG. 3, with the exception of the location of the chilling apparatus 13 and the addition of a gas-to-gas regenerative heat exchanger 66, has essentially the same construction as described above for the natural gas conditioning facility of FIG. 1.

As shown in FIG. 3, the chilling apparatus 13 is located upstream of the storage tanks 14 for chilling or dewatering the CNG before storage. Chilling before storage keeps water out of the storage tanks 14 to reduce corrosion and improve tank life. The CNG is rechilled by a second heat exchanger 67 in the secondary cooling loop 39 of the refrigeration system 20 before being dispensed to the vehicle fuel tanks to solve the full fill problem. The regenerative heat exchanger 66 recovers the cooling energy used to dewater the CNG that would otherwise be lost during storage. Recovering the cooling energy allows the size of the chiller 38 and associated power requirements to be reduced.

As an alternative to regeneration, insulation 88 can be provided on the storage tanks 14 to maintain the cooled temperature of the CNG during storage which reduces or eliminates the need to rechill the CNG before dispensing. As a further alternatively, the storage tanks 14 could be eliminated so that the chilling apparatus 13 is located directly down stream of the compressor 17 for consecutive chilling, compressing, and dispensing. It should be noted, however, that the temperature of the CNG at the exit of the final cooling stage of the compressor 17 is generally higher than the temperature of the gas in the storage tanks which is typically ambient temperature. Therefore, a chiller of increased capacity may be required to cool the CNG from the higher temperature.

The CNG flows from the compressor 17 to the tube inlet of the heat regenerative heat exchanger 66. The CNG flows through tubes of the regenerative heat exchanger and then through the tubes of the heat exchanger 41 in thermal communication with the secondary heat exchange fluid and is generally cooled to approximately 35 degrees F. to substantially condense any water vapor and/or higher hydrocarbons in the CNG. As the CNG flows from the outlet 27 of the heat exchanger 41, carrying along the condensed liquids, it passes to the inlet of the liquid separator 21. The liquid separator 21 removes or separates the condensed liquids from the CNG. The CNG flows from the outlet of the liquid separator 21 to the inlet of the desiccant bed 22. The CNG passes through the desiccant bed 22 and any residual liquids remaining in the CNG are substantially removed.

As the CNG flows from the outlet of the desiccant bed 22 it passes to the shell inlet of the regenerative heat exchanger 66 and through the shell in thermal communication with the CNG passing through the tubes. The relatively cool and dry CNG in the shell cools the relatively warm and wet CNG in the tubes to substantially recover the cooling energy used to dewater the CNG. As the CNG flows from the shell outlet 27 of the regenerative heat exchanger 66, it passes to the inlet of the storage tanks 14.

When a vehicle is to be-refueled, the CNG flows from the distribution valve 15 of the fuel storage system 11 to the tube inlet of the second heat exchanger 67. The CNG flows through tubes of the heat exchanger 41 in thermal communication with the secondary heat exchange fluid and is generally cooled to approximately 35 degrees F. to solve the full fill problem. As the CNG flows from the outlet of the second heat exchanger 67 it passes to the inlet of a second liquid separator 68. It is noted that the second liquid separator is not typically required because the CNG is dry before it goes into the storage system 11. It is noted that all the liquid separators, including the compressor stages, are preferably connected to a common collection point. The CNG flows from the outlet of the liquid separator 68 to the fuel input line 18 of the dispensing system 12. The CNG is thereafter dispensed into the vehicle fuel tanks through the fuel connector 19.

Figure 4:
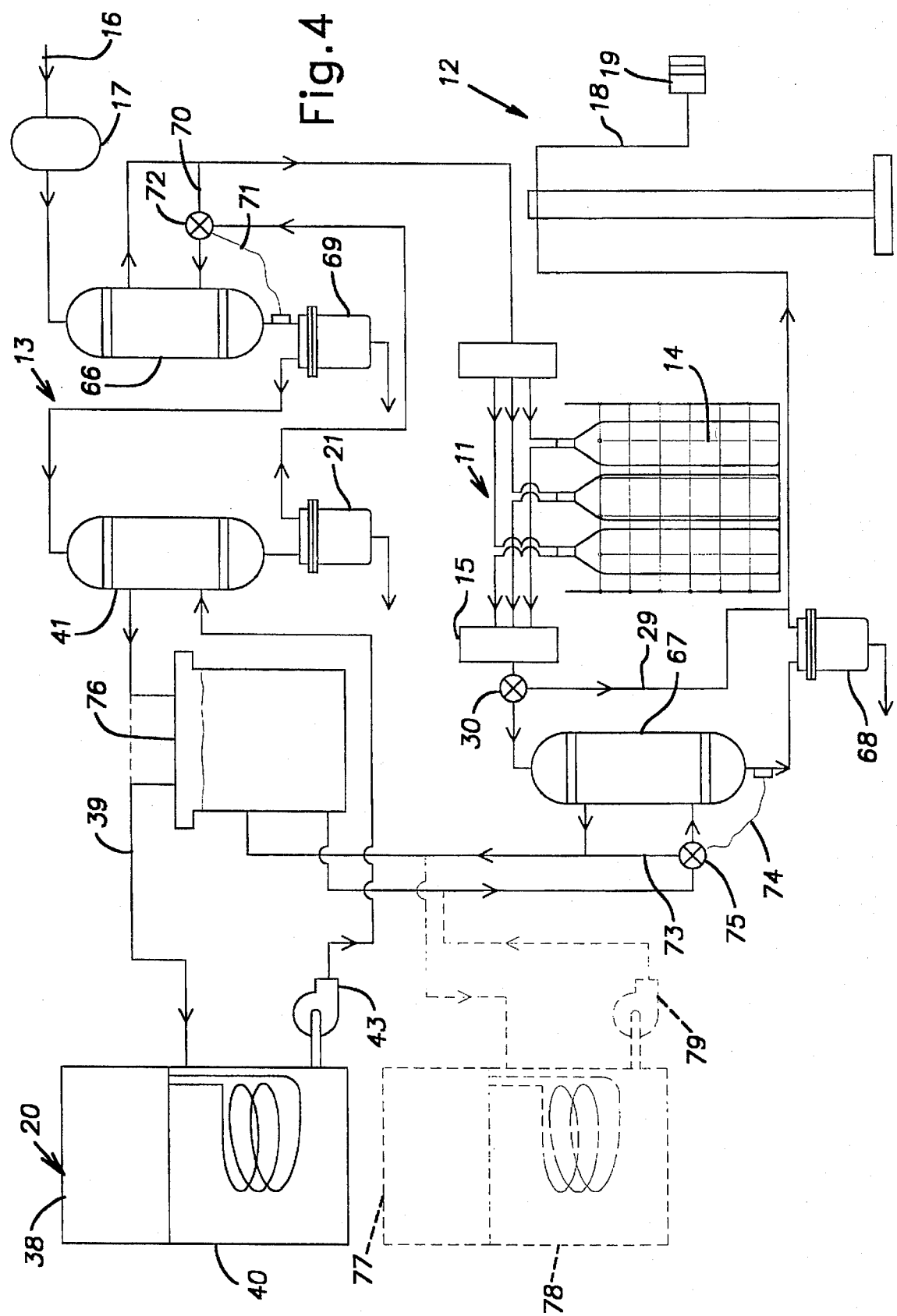
FIG. 4 is a diagrammatic illustration of a variation of the natural gas conditioning facility of FIG. 3.

A variation of the natural gas conditioning facility of FIG. 3 is diagrammatically shown in FIG. 4. The natural gas conditioning facility of FIG. 4, with the exception of freezing out residual water from the CNG rather than desiccant bed polishing, has essentially the same construction as described above for the natural gas conditioning facility of FIG. 3.

The CNG flows from the compressor 17 to the tube inlet of the heat regenerative heat exchanger 66. The CNG flows through tubes of the regenerative heat exchanger and is cooled to approximately 35 degrees F. to substantially condense any water vapor and/or higher hydrocarbons in the CNG. As the CNG flows from the outlet 27 of the regenerative heat exchanger 66, carrying along the condensed liquids, it passes to the inlet of a liquid separator 69. The liquid separator 69 removes or separates the condensed liquids from the CNG. The CNG passes from the outlet of the liquid separator 69 to the tube inlet of the heat exchanger and through the tubes of the heat exchanger 41 in thermal communication with the secondary heat exchange fluid and is cooled to a sub-freezing temperature, preferably about −10 degrees F., to substantially freeze any water vapor and/or condense higher hydrocarbons remaining in the CNG. The heat exchanger 41 can be arranged to be warmed periodically when not fueling vehicles to defrost or thaw and drop out the frozen liquids. Preferably, the heat exchanger 41 is defrosted by warming the secondary heat exchange fluid with electrical resistance heating. Alternatively, a defrost loop can be provided which is in thermal cooperation with the condenser of the chiller 38 to heat the secondary heat exchange fluid with condenser heat like the defrost mode of a heat pump. The tendency for the ice to incorporate gas molecules to form hydrates must be factored into the defrost design in that higher melt temperatures may be required.

It may be necessary to set the exit temperature of the regenerative heat exchanger higher than 35 degrees F. to avoid hydrate formation. Alternatively, the regenerative heat exchanger may also be periodically defrosted.

As the CNG flows from the outlet of the heat exchanger 41 it passes to the inlet of the liquid separator 21. The liquid separator 21 removes liquid water and condensed higher hydrocarbons that won't freeze and any ice that is carried with them and collects products of the defrost cycle. Most of the time the liquid separator 21 will only collect products of the defrost cycle because all the water will become ice. As the CNG flows from the outlet of the liquid separator 21 it passes to the shell inlet of the regenerative heat exchanger 66 and through the shell in thermal communication with the CNG passing through the tubes to cool the CNG in the tubes to about 35 degrees F. As the CNG flows from the shell outlet of the regenerative heat exchanger 66, it passes to the inlet of the storage tanks 14. The CNG is dispensed from the storage tanks as described above for the natural gas conditioning facility of FIG. 3.

It is noted that all of the water can be removed by freezing in a single heat exchanger. This approach, however, would require relatively frequent defrost cycles but may be practical and attractive where water concentration in gas supplied to the facility is unlikely to exceed about 7 lbs./MMBTU.

Preferably, a bypass line 70 having a control system 71 with a valve 72 is provided to selectively divert a portion of the cold CNG past the heat exchanger 66. Bypassing the heat exchanger 66 avoids excessive cooling or freezing of the incoming CNG in the tubes of the heat exchanger 66. A bypass line 73 having a control system 74 with a valve 75 is also preferably provided to selectively divert a portion of the secondary heat exchange fluid past the heat exchanger 66. Bypassing the heat exchanger 66 avoids excessive cooling or freezing of the CNG to be dispensed to the vehicle fuel tanks to reduce the amount of power required to run the chiller 38 and thereby improving efficiency.

To further improve efficiency, a storage tank 76 can be provided in the secondary cooling loop 39 after the heat exchanger 41 as shown in FIG. 4. The storage tank 76 operates as a buffer or reservoir for relatively warm secondary heat exchange fluid coming from the heat exchanger 41. The secondary heat exchange fluid in the storage tank 76 is then used to rechill the CNG in the heat exchanger 67 before the CNG is dispensed to the vehicle fuel tanks. The storage tank 76, therefore, reduces the demand for the deep cold secondary heat exchange fluid and thereby reduces the amount of power required to run the chiller 38.

Figure 5:
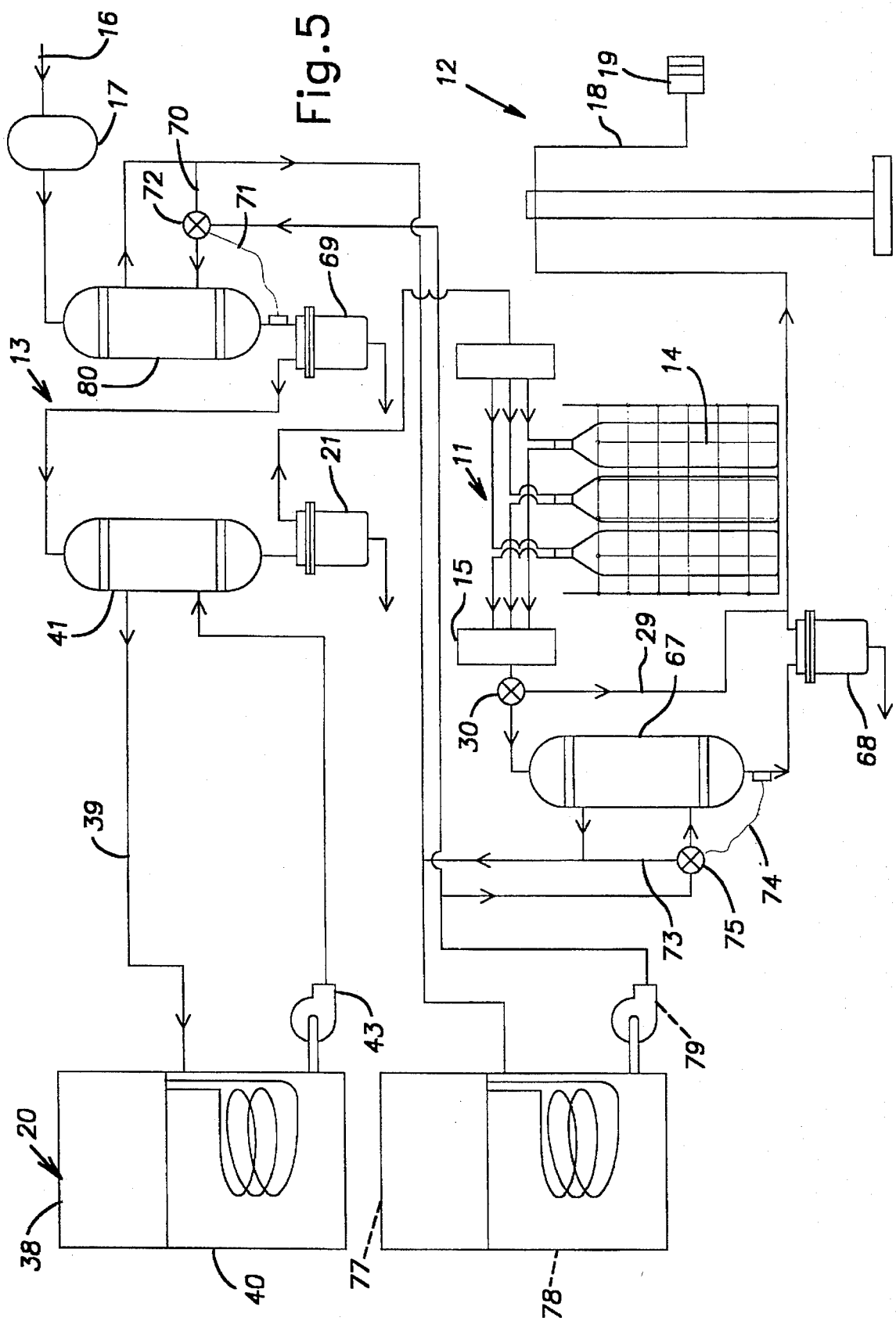
FIG. 5 is a diagrammatic illustration of a variation of the natural gas conditioning facility of FIG. 4.

A variation of the natural gas conditioning facility of FIG. 4 is diagrammatically shown in FIG. 5. The natural gas conditioning facility of FIG. 5, with the exception of using two chillers 38, 77, has essentially the same construction as described above for the natural gas conditioning facility of FIG. 4. A second chiller 77 with associated storage tank 78 and pump 79 is provided to reduce operating costs, such as those due to thermal losses in the circuit, associated with deep cooling the CNG to about 32 degrees F. and below.

In the illustrated configuration of FIG. 5, the first chiller 38 is associated with the freezing heat exchanger 41 and the second chiller 78 is associated with the recooling heat exchanger 67 and a precooling heat exchanger 80. Alternatively, the first chiller 38 is associated with the freezing heat exchanger 41 and the regenerative heat exchanger 80 and the second chiller 77 is solely associated with the recooling heat exchanger 67 as shown in dashed line on FIG. 4.

The first chiller 38 cools the secondary heat exchange fluid to a temperature, for example −20 degrees F., to deep cool the CNG to a temperature, for example to −10 degrees F., that is adequate to freeze out residual vapors in the CNG. The second chiller 77 cools secondary heat exchange fluid to a temperature, for example 30 degrees F., adequate to recool the CNG to a temperature, for example to 35 degrees F., that is adequate to obtain a full fill. As illustrated in FIG. 5, the second chiller 77 is also associated with a precooling heat exchanger 80 to precool the CNG and condense out liquids with its relatively warm secondary heat exchange fluid 66 rather than regeneratively using the deep cold CNG exiting the freezing heat exchanger 41. The use of two chillers 38, 77, therefore, reduces costs associated with deep cooling and also advantageously adds redundancy to the conditioning facility.

Figure 6:
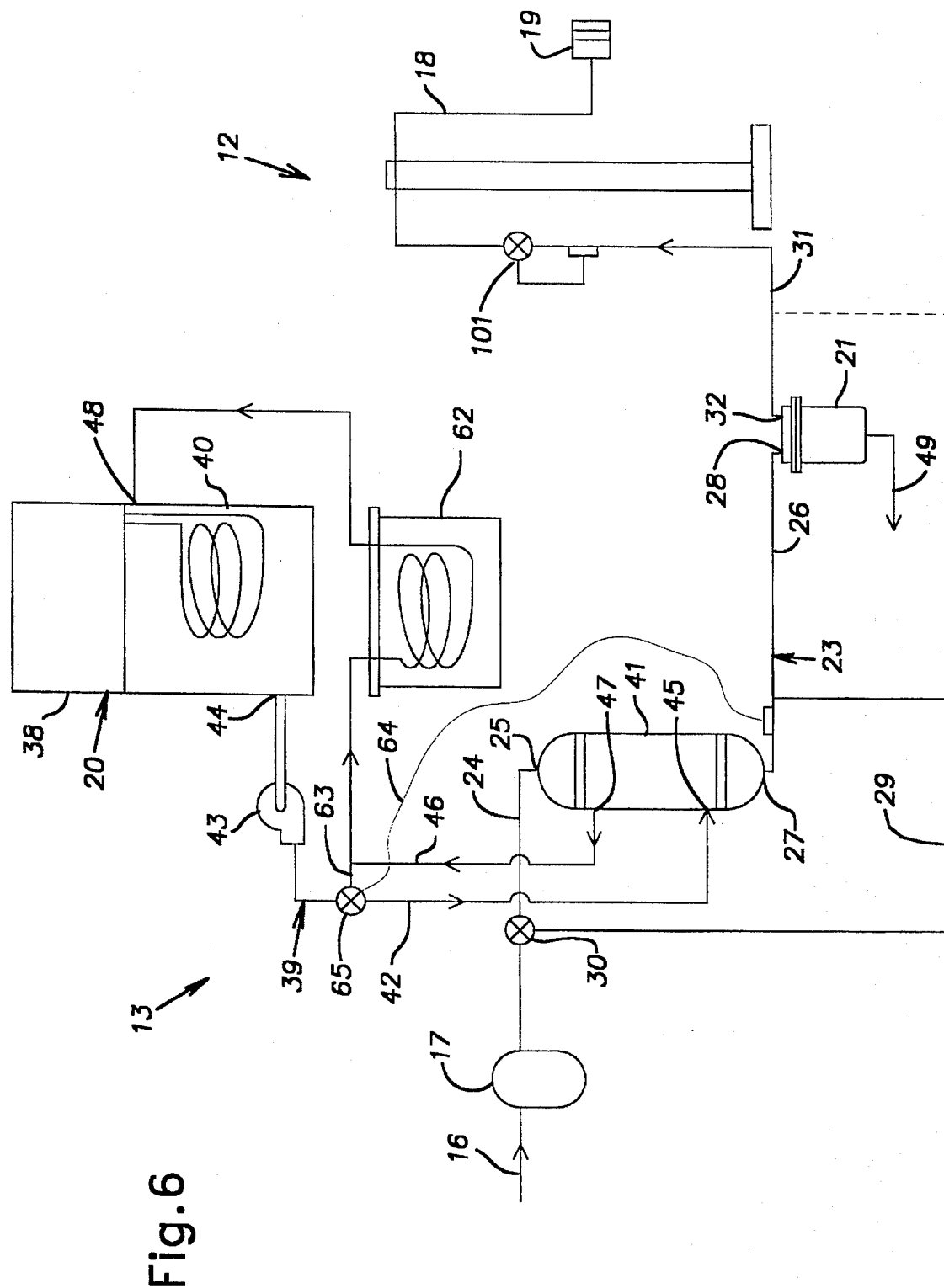
FIG. 6 is a diagrammatic illustration of a natural gas conditioning facility in accordance with a third embodiment of the invention.

FIG. 6 illustrates another embodiment of the invention; the various components of the system of FIG. 6 that are essentially the same in function as those of the system of FIG. 1 are identified with the same numerals. A back pressure regulator 101 maintains the pressure in the system at a predetermined high pressure of say in the range of between 3000 and 5000 psi. It is desirable to maintain high gas pressure in the heat exchanger 41 to maximize the benefits of chilling the natural gas. During the initial phase of fueling vehicles the line pressure at the vehicle may drop to near the initial pressure in the vehicle tanks and then rise as the tank pressure rises. Natural gas chilled to 35 degrees F. at, say, 1000 psi as representative of an early fill condition retains twice the water vapor (8 pounds/MMSCF) as natural gas at 35 degrees F. and 3600 psi (4 pounds/MMSCF). Keeping the natural gas in the heat exchanger 41 at full design pressure during the entire fill process, minimizes the water vapor in the gas sent to the vehicle.

In addition, chilling to achieve full fills is also adversely affected by lower pressure. In fast fills the final amount of gas on board the vehicle is directly related to the enthalpy of the natural gas supplied. The enthalpy of natural gas at 35 degrees F. and 1000 psi is about 70 BTU/pound higher than at 35 degrees F. and 3600 psi. This enthalpy increase at a lower pressure significantly lowers the amount of natural gas able to be loaded onto a vehicle, particularly during hot summer days.

High pressure can be maintained in the heat exchanger 41 by several techniques. The simplest is a calibrated orifice in the line downstream of the heat exchanger that chokes the flow; a preferred method in the provision of the pressure regulator 101 illustrated in the line 31 downstream of the heat exchanger 41 and upstream of the dispensing line 18.

Although particular embodiments of the invention have been described in detail, it will be understood that the invention is not limited correspondingly in scope, but includes all changes and modifications coming within the spirit and terms of the claims appended hereto.

What is claimed is:

1. A facility for conditioning natural gas to be dispensed in a compressed state to vehicle fuel tanks, said facility comprising:

a fuel storage system for compressed natural gas;

a dispensing system for dispensing said compressed natural gas to the vehicle fuel tanks;

a chilling apparatus including a refrigeration unit for cooling the natural gas to a sub ambient temperature and a liquid separator for removing condensed water and other liquid contaminants from the natural gas cooled by said refrigeration unit; and a fuel delivery circuit coupling said fuel storage system, said dispensing system, and said chilling apparatus in a manner such that gas passing through said circuit to said dispensing system is chilled by said chilling apparatus and thereby permits a fuel tank to be filled without overpressuring such tank.

2. The facility as set forth in claim 1, wherein said delivery circuit includes a desiccant bed for drying said natural gas downstream of said liquid separator.

3. The facility as set forth in claim 2, wherein said desiccant bed contains a quantity of desiccant effective for operating at least a season of approximately four months.

4. The facility as set forth in claim 1, further comprising at least one compressor for compressing the natural gas and wherein the capacity of said refrigeration unit is sized to chill the steady flow capacity of the compressor on the warmest day expected at the site of the facility.

5. The facility as set forth in claim 1, wherein said chilling apparatus includes an intermediary cooling loop having an intermediary heat exchange fluid in thermal communication with said refrigeration unit and said compressed natural gas, and a pump for circulating said intermediary heat exchange fluid in said intermediary cooling loop.

6. The facility as set forth in claim 5, wherein said chilling apparatus includes a tank for storing said intermediary heat exchange fluid at a sub ambient temperature.

7. The facility as set forth in claim 6, wherein said compressed natural gas is in thermal communication with said intermediary heat exchange fluid in said storage tank.

8. The facility as set forth in claim 5, wherein said compressed natural gas is in thermal communication with said intermediary heat exchange fluid in a heat exchanger.

9. The facility as set forth in claim 5, wherein said refrigeration unit is located remote from said fuel delivering means.

10. The facility as set forth in claim 5, wherein an ice storage tank is located in said intermediary cooling loop.

11. The facility as set forth in claim 10, wherein said intermediary heat exchange fluid is in thermal communication with said ice storage tank after said compressed gas and before said refrigeration system.

12. The facility as set forth in claim 1, wherein said chilling apparatus is located in said fuel delivery circuit downstream of a fuel storage system.

13. The facility as set forth in claim 1, wherein said chilling apparatus is located in said fuel delivery circuit upstream of a fuel storage system.

14. The facility as set forth in claim 13, wherein said fuel storage system includes tanks for storing said compressed natural gas and insulation for retaining said compressed natural gas in said tanks generally at said sub ambient temperature.

15. The facility as set forth in claim 13, wherein said chilling apparatus includes an intermediary cooling loop having an intermediary heat exchange fluid in thermal communication with said refrigeration unit, a pump for circulating said intermediary heat exchange fluid in said intermediary cooling loop, a first heat exchanger in said fuel delivery circuit upstream of said fuel storage system for cooling said compressed natural gas with said intermediary heat exchange fluid, and a second heat exchanger in said fuel delivery circuit downstream of said fuel storage system for recooling said compressed natural gas with said intermediary cooling fluid.

16. The facility as set forth in claim 15, wherein said intermediary cooling loop includes a storage tank downstream of said first heat exchanger for storing relatively warm intermediary cooling fluid and said second heat exchanger is in fluid communication with said storage tank for recooling said compressed natural gas with said relatively warm intermediary cooling fluid.

17. The facility as set forth in claim 13, further comprising a second chilling apparatus located in said fuel delivery circuit downstream of said fuel storage system for recooling said compressed natural gas.

18. The facility as set forth in claim 1, wherein said chilling apparatus includes a gas-to-gas heat exchanger for regeneratively cooling said compressed natural gas with cool compressed natural gas at said sub ambient temperature.

19. The facility as set forth in claim 1, wherein said refrigeration unit cools said compressed natural gas to a near the freezing temperature of water or methane hydrates under the pressure existing in the natural gas circuit following compression of the natural gas.

20. The facility as set forth in claim 1, wherein said refrigeration unit cools said compressed natural gas to a sub freezing temperature.

21. The facility as set forth in claim 20, wherein said chilling apparatus includes a first heat exchanger for cooling said compressed natural gas to a near freezing temperature and a second heat exchanger for cooling said compressed natural gas at said near freezing temperature to a sub freezing temperature.

22. A method for conditioning compressed natural gas in a vehicle fueling process comprising the steps of chilling the compressed natural gas with a refrigeration unit to a sub ambient temperature, and separating condensed water vapor from the natural gas with a liquid separator.

23. The method as set forth in claim 22, further comprising the step of flowing the natural gas through a desiccant bed down stream of the liquid separator.

24. The method as set forth in claim 22, wherein said step of chilling the natural gas comprises the steps of cooling the natural gas to a near water freezing temperature and subsequently cooling the compressed natural gas to a sub water freezing temperature.

25. The method as set forth in claim 22, further comprising the step of regeneratively recovering the cooling used in the step of chilling the compressed natural gas.

\* \* \* \* \*